United States Patent [19]

Turchaninov et al.

[11] 3,852,171

[45] Dec. 3, 1974

[54] PROCESS FOR MANUFACTURING TANTALUM-OXIDE SEMICONDUCTOR CAPACITORS

[76] Inventors: Georgy Sergeevich Turchaninov, Studgorodok, 5, kv. 916; Anatoly Vasilievich Voronkov, Studgorodok, 5, kv. 911, both of Krasnoyarsk, U.S.S.R.

[22] Filed: Oct. 12, 1973

[21] Appl. No.: 406,097

Related U.S. Application Data

[63] Continuation of Ser. No. 230,945, March 1, 1972, abandoned.

[30] Foreign Application Priority Data

Mar. 29, 1969  U.S.S.R............................. 1313063

[52] U.S. Cl................ 204/38 A, 204/42, 204/56 R, 204/96
[51] Int. Cl. ...................... C01b 13/14, C23b 11/02
[58] Field of Search............ 204/38 A, 42, 56 R, 96; 317/235; 252/62.2

[56] References Cited

UNITED STATES PATENTS

| 3,471,378 | 10/1969 | Fukui.................................. 204/42 |
| 3,631,302 | 12/1971 | Robinson............................ 204/42 |
| 3,732,470 | 5/1973 | Robinson............................ 204/42 |

*Primary Examiner*—R. L. Andrews
*Attorney, Agent, or Firm*—Holman & Stern

[57] ABSTRACT

A process is disclosed for manufacturing tantalum-oxide semiconductor capacitors comprising forming a tantalum oxide layer on a tantalum substrate by electrochemically oxidizing it in an aqueous manganese salt solution and depositing a semiconductive manganese oxide layer over the tantalum oxide layer in the same electrolyte under potentiostatic conditions, followed by applying a cnducting coating onto the manganese oxide layer.

2 Claims, No Drawings

PROCESS FOR MANUFACTURING TANTALUM-OXIDE SEMICONDUCTOR CAPACITORS

This is a continuation, of application Ser. No. 230,945, filed Mar. 1, 1972, now abandoned.

BACKGROUND OF THE INVENTION

The present invention relates to processes for the manufacture of electric capacitors, and more particularly, it relates to processes for the manufacture of tantalum-oxide semiconductor capacitors.

A process for the manufacture of tantalum-oxide semiconductor capacitors is know in the art (cf. Swiss Pat. No. 353,466; C1.21g10/03), wherein a thin tantalum oxide layer is formed on a tantalum anode by electrolytically oxidizing the tantalum anode in an acidic electrolyte. A semiconductive manganese dioxide layer is then forced on the tantalum oxide layer surface by pyrolysis of magnesium nitrate, followed by depositing a conducting coating onto the manganese dioxide layer.

The prior-art process does not produce a thin and sufficiently dense semiconductive layer of manganese dioxide, since the manganese nitrate suffer decomposition within its entire volume during pyrolysis, whereas a solid pyrolysis product, viz., manganese dioxide, is a porous, friable, thick layer on the surface of the tantalum oxide layer. The semiconductive manganese dioxide layer thus obtained does not provide sufficient reliability in use, and results in high values of dielectric loss in the capacitors.

In the prior-art process a partial destruction of the tantalum oxide layer is observed, which is caused by simultaneous action, on the tantalum oxide layer, of water vapour and nitrogen oxides evolved during the pyrolysis of manganese nitrate. The destruction of the tantalum oxide layer, in turn, results in increased leakage current in the capacitors manufactured and reduces the break-down voltage thereof.

These disadvantages are partially eliminated by successively repeating the operations of producing the tantalum oxide layer and the manganese oxide layer, while the voltage across the electrolytic bath, wherein the tantalum oxide layer is formed, is chosen so as to be 3 to 4 times greater than the rated operating voltage of the capacitor. In doing so however, the high values of capacitor dielectric loss are still retained, the product of the capacitance and the operating voltage of the capacitor is lowered, and the time required for the formation of the tantalum oxide layer and manganese dioxide layer is considerably increased, which time in the case of the manufacture of volume-porous metal-oxide semiconductor capacitors amounts to 20 hours.

The prior-art process makes it impossible to produce an external conducting coating on the manganese dioxide layer surface by vacuum condensation or cathodic scattering and requires, during the pyrolysis of manganese nitrate, that the capacitors be heated up to 250°–400°C, which hampers the production, by the known process, of thin-film capacitors used in integral circuits.

The prior-art process is accompanied by the evolution into the environment or gaseous nitrogen oxides during the pyrolysis of manganese nitrate, and of manganese dioxide in the form of fine dust during the removal of surplus manganese dioxide from the surface of the capacitor being manufactured, thus potentially causing damage to the health of the personnel employed in the manufacture of the capacitors.

SUMMARY OF THE INVENTION

It is an object of the present invention to provide a process for manufacturing tantalum-oxide semiconductor capacitors, wherein the operation of producing a semiconductive manganese oxide layer is not associated with the use of pyrolysis of manganese compounds and enables the production of a dense and thickness-controllable, manganese oxide layer, the time necessary for the tantalum oxide and manganese oxide layers to be formed, being reduced.

Said object has been accomplished according to the present invention by oxidizing a tantalum substrate in an electrolytic bath containing an aqueous manganese salt solution under galvanostatic conditions; to form a tantalum oxide layer. The value of the current flowing through the bath is chosen to be sufficient to provide, across the bath, a voltage approximately 2 to 3 times higher than the rated voltage of the capacitor to be manufactured. Upon achieving this voltage across the bath, the semiconductive manganese oxide layer is formed by depositing manganese oxide onto the tantalum oxide layer in the same electrolyte under potentiostatic conditions.

It is advantageous to use manganese nitrate or manganese sulphate as the manganese salt.

The advantages of the present invention reside in that during the formation of the semiconductive manganese oxide layer the underlying tantalum oxide layer is not damaged; the manganese oxide layer is more dense and thin; the overall time required for the formation of the tantalum oxide and manganese oxide layers is reduced several times; the necessity of heat treating the capacitor during deposition of the manganese oxide layer is avoided; the external conducting coating may be applied by vacuum condensation or cathodic scattering; and gaseous and finely dispersed substances harmful to human health are not evolved during the formation of the manganese oxide layer. The product of the specific capacitance of the capacitor and its operating voltage is 1.5 to 2 times greater, and the dielectric power factor is lowered.

The process for manufacturing tantalum-oxide semiconductor capacitors according to the present invention may be embodied as follows.

The starting tantalum substrate may be a porous body, wire, strip or thin film placed on a substrate of another material such as sitale plate.

The tantalum substrate surface may be subjected, when required, to pre-cleaning consisting, for instance, in etching with hydrofluoric acid or degreasing with hot ethylene trichloride.

The tantalum substrate is placed into an electrolytic bath and functions as an anode, while for example a tantalum or graphite plate may serve as a cathode.

The electrolyte can be an aqueous solution of a manganese salt such as manganese nitrate or sulphate. During the treatment of the tantalum substrate in the bath the temperature thereof is maintained constant within a range of from room temperature to 90°C with an accuracy of ±2°C by means of a thermostatic device for the purpose of reliable reproduction of the results. Voltage is applied to the bath from a controlled constant-voltage source, and a tantalum oxide layer is formed on the tantalum substrate under galvanostatic conditions. The current flowing through the bath is chosen to be sufficiently high to provide, across the bath, a voltage 2 to 3 times greater than the rated operating voltage of the capacitor to be manufactured. The bath voltage is referred to hereinafter as the formation voltage.

When the formation voltage is reached, the potentiostatic conditions are maintained in the bath, whereupon a semiconductive manganese oxide layer is formed on the surface of the tantalum oxide layer. An average semiconductive layer thickness is determined by the time of the bath exposure to potentiostatic conditions, and calculated on the basis of Faraday's Law. The uniformity of the manganese oxide layer thickness is greatly influenced by the state of the surface relief of the tantalum substrate; the more pronounced is the roughness of the substrate, the more non-uniform is the thickness of the resulting manganese oxide layer.

Levelling of the manganese oxide layer thickness is accomplished by increasing the value of the current flowing through the bath under galvanostatic conditions. It should be noted, however, that in some cases this treatment reduces the electric strength of the tantalum oxide layer.

Upon deposition of the manganese oxide layer on the surface of the capacitor being produced, the sample is removed from the bath, washed with distilled water and dried in a drying cabinet at a temperature of 50°–80°C. Thereafter, a conducting coating is applied onto the manganese oxide layer by any conventional methods such as by coating with a conducting lacquer or depositing a gold layer by vacuum condensation.

The following specific example will serve to illustrate the embodiment of the process according to the present invention with greater particularity.

EXAMPLE

A tantalum substrate, refined by vacuum fusion, in the form of a rolled plate is degreased in hot ethylene trichloride and submerged into an electrolytic bath containing manganese nitrate having the composition $Mn(NO_3)_2.6H_2O$ and heated up to 60°C as the electrolyte. The surface area of the tantalum substrate submerged into the electrolyte was 24 cm². Thereafter, voltage from a direct-current source was applied to the bath so that the tantalum substrate was the anode and another tantalum electrode was the cathode. On the submerged surface of the tantalum substrate a tantalum oxide layer was formed under galvanostatic conditions and at a current of 11.5 mA; when the bath voltage of 40 V was reached, this voltage was stabilized and a semiconductive manganese oxide layer was deposited under potentiostatic conditions. Therewith, the current flowing through the bath decreased to 5–7 mA and was then spontaneously stabilized. With the voltage across the bath and current flowing therethrough being constant, the tantalum substrate was kept in the bath for a period of 70–80 min, whereby a manganese oxide layer with a thickness of about 5 mcm was formed thereon. Then the tantalum substrate coated with the tantalum oxide layer and overlying manganese oxide layer was removed from the bath, washed with distilled water, and dried. A conducting coating based on finely dispersed silver was applied onto the manganese oxide layer by a conventional method.

The capacitor thus produced can operate at a rated voltage of 20 V with capacitance 1.5 to 2 times greater than that of a capacitor manufactured by the known process.

We claim:

1. A process for manufacturing tantalum-oxide semiconductor capacitors comprising; forming a tantalum oxide layer on a tantalum substrate by electrochemical oxidization means including an electrolytic bath containing an aqueous manganese salt solution with a current flowing through the electrolytic bath sufficient to provide a voltage across said bath 2 to 3 times greater than the rated voltage of the capacitor to be manufactured; forming a semiconductive manganese oxide layer on said tantalum oxide layer when said voltage has been achieved by depositing manganese oxide thereon in said electrolytic bath containing said aqueous manganese salt solution under potentiostatic conditions; applying a conducting coating onto said semiconductive manganese oxide layer.

2. A process for manufacturing tantalum-oxide semiconductor capacitors as claimed in claim 1, wherein said manganese salt is manganese nitrate.

* * * * *